Patented Sept. 23, 1930

1,776,362

UNITED STATES PATENT OFFICE

HUGO G. LOESCH, OF ROCHESTER, NEW YORK, ASSIGNOR, BY MESNE ASSIGNMENTS, TO GENERAL FOODS CORPORATION, OF NEW YORK, N. Y., A CORPORATION OF DELAWARE

PROCESS OF PRODUCING JELLIFYING SUBSTANCES

No Drawing.   Application filed December 29, 1925. Serial No. 78,234.

My invention relates to jellifying substances and more particularly to pectin prepared from citrus fruits such, for example, as lemons.

The fruits of the citrus family are much alike in structure although differing in color, shape, size and flavor. The outer rind is colored and contains an essential oil in its numerous cells. The inner rind is white, while the fleshy part is made up of vesicles containing the juice proper.

The juice of the lemon, one of the most important citrus fruits, contains approximately 6% or more of citric acid and in the commercial manufacture therefrom of citrate of lime or citric acid there remains after the expression of the juice from the fruit, a waste by-product or pomace, consisting essentially of the inner spongy white rind, together with the yellow rind which is sometimes removed for oil purposes.

This pomace is rich in pectin, a substance found in widely varying quantities in the different fruits and which forms a jelly with the proper proportions of sugar, acid and water. Pectin is widely used to make jam, jellies and other food products, but its isolation from lemon pomace as a commercial product has been hindered by certain inherent difficulties pointed out later herein.

My invention comprises the production from such pomace, with maximum yield, of a pectin solution, pectin concentrate and a dry pectin, all of which will produce clear jellies. Moreover, the process employed is a cheap and economical one and produces a pectin which is not chemically changed during the process and which is completely soluble in water.

In the lemon rind there are certain substances and in particular hesperidin, which are practically insoluble in cold or warm water, but which dissolve out along with the pectin when the pomace is cooked. The cooking liberates both pectin and hesperidin and other like-insolubles at the boiling temperature. As the solution cools, hesperidin and like substances begin to precipitate out, forming a milky suspension, almost of colloidal size. The pectin however remains in solution after its liberation from the pomace. The milky suspension is practically unfilterable by ordinary means and filter aids and does not readily settle out. Further, jellies made with the pectin solution containing such milky suspension are very cloudy. This difficulty has militated against the use of lemon pomace as a source of pectin which would produce clear sparkling jellies.

My invention comprises the removal of this turpidity, to such a degree at least that the pectin solution can be combined with sugar in proper proportions to make clear jellies.

To secure maximum yield of pectin from the pomace, the pomace is grated or ground to a pulp, thus rupturing the individual cells of the rind. A small amount of a suitable organic acid is desirable to effect a quick solution and maximum yield of pectin from its insoluble form in the pomace. The pomace after the expression of the lemon juice usually contains sufficient residual acid for cooking and it is not necessary to add extra acid.

Along with the pectin and turbidity-producing substances are extracted also a certain amount of color and essential oil of the outer rind.

My invention comprehends the removal of the milky turbidity from the pectin extract by the addition of a colloid that will precipitate or flocculate the substances in suspension without precipitating the colloidal pectin. Further it is desirable, although not necessary, that the colloid used be self-removing, i. e. it is completely precipitated along with the milky suspension which settles out. The supernatant pectin solution can then be drawn off from the bottoms after settling and then filtered readily through filter-masse such as paper pulp or in any suitable filter.

I have discovered that the vegetable starches, corn, potato, rice, wheat and tapioca accomplish the above desired result satisfactorily and are about equally effective in their action. The addition of starch solution to the pectin solution causes a flocculation which begins to settle and after 12 to 24 hours there results a heavy sediment at the bottom of the containing vessel with readily-filtrable pectin solution above. The longer the time allowed, the more compact the sediment. The starch simultaneously settles out also; so that there results a pectin liquor free from objectionable turbidity and starch. I have found 0.05 to 0.10% starch (and somewhat higher) sufficient to obtain the desired result without leaving any starch in the pectin solution. Approximately 0.09% is usually sufficient.

The starch is added in the form of a 1 or 1½% solution to the pectin solution, either hot or cold, and most conveniently after the pectin solution is collected in a tank. It may be incorporated with the pomace during the cooking and still accomplish its effect. The range of temperature most convenient for practical purposes is 70° to 120° F. The starch solution is prepared in the usual way i. e. a cold water suspension of the starch is added to boiling water and then boiled for 10 or more minutes.

I desire to point out here a peculiar property of hesperidin. Although practically insoluble in cold or warm water, it is sufficiently soluble, so that on concentrating a saturated solution of it, it slowly forms silky-like needles or rods.

It is desirable, therefore, in cooking the pomace to add only the minimum amount of water necessary to obtain a pectin solution containing as much pectin as possible but yet not too viscous for pressing, settling and filtering, e. g. a solution that will carry, say, one to one and one-half parts of sugar. One part of such solution will make 1⅔ to 2½ parts of jelly of good commercial strength. Test jellies should contain approximately 60% sugar and approximately 0.25% acid, e. g. 200 grams of a juice carrying one part sugar will be boiled with 200 g. sugar to make 334 g. net of jelly.

The starch treatment removes all the hesperidin not soluble in the pectin solution at a given temperature. The dissolved hesperidin is in actual solution and causes no turbidity whatever.

On concentrating the clear pectin solution the very small amount of hesperidin present in excess of its solubility in the concentrate precipitates out, causing a turbidity. This turbidity will not cause turbid or cloudy jellies, because in making jelly with the concentrate, water and sugar are added and the slight amount of hesperidin present is completely dissolved.

There remains after the removal of the objectionable milky suspension, a clear, pale yellow pectin solution with a slight flavor of lemon. This solution is concentrated in vacuo, and in doing so it is found that the pectin solution is practically deflavored, the lemon flavor passing off with the vapor in the process of concentration.

In producing the dry pectin from the extract or a concentrate thereof, I employ a suitable precipitant, such as ethyl alcohol which is readily obtainable and easily recoverable. The concentrate described above is added slowly in fine streams to one or more volumes of 95% ethyl alcohol at room temperature with constant stirring. Any suitable alcohol may be used and the ethyl alcohol may be denatured with a suitable denaturant. The precipitate is then pressed and washed further with alcohol to remove mother liquor and dehydrate the precipitate. The pectin precipitate is then dried. Any flavor, color, sugar and glucosides that may be in the pectin concentrate remain dissolved in the mother liquor and in alcohol, and are not precipitated along with the pectin.

The dried pectin contains an insignificant amount of hesperidin which in no wise affects the clarity or quality of jellies made with this pectin.

The following is a brief general description of my process which can be varied of course in its details without departing from the spirit of my invention.

The lemon rind or pomace resulting from the process of expressing the juice or oil from the fruit is ground to a pulp and cooked at atmospheric pressure for, say, 30 minutes with approximately 3 parts of water (more or less as needed to obtain the desired consistency). Steam coils or preferably live steam may be used. It can be cooked in a closed vessel under pressure, if desired, with corresponding decrease in time of cooking, depending on the pressure. It can be treated with hot water somewhat below the boiling point, but this extraction is not as effective or quick as cooking at the boiling point which secures maximum yield of pectin.

After cooking, the hot mass is pressed in a suitable press, e .g. of screw or hydraulic type, and the pectin solution is cooled to between 70° to 120° F. for the starch treatment.

To the pectin extract is added approximately 0.09% starch in the form of a 1 or 1½% solution. The settling process is allowed to proceed overnight and the next day and longer if desired. The supernatant liquor is then drawn off.

The pectin solution is then filtered clear through an ordinary pulp filter or a filter press with or without filter aids.

The pectin solution is then concentrated in vacuo to carry, say, 4 or 5 or more parts of sugar. The concentrate is added slowly in fine streams to one or more volumes of ethyl alcohol with constant stirring. The alcohol is at room temperature when the concentrate is added. The concentrate may be at room temperature likewise or slightly warmed, say, to 120° F. to decrease its viscosity.

The precipitate is then pressed in a suitable press, broken up in a picker, resoaked with 95% alcohol and repressed. This second pressing and a third if desired removes fairly completely the mother liquor and dehydrates the pectin, so that it dries very readily to a desirable friability in contrast with an undehydrated precipitate which dries to a hard horny character, difficult to grind and powder.

The precipitate is then dried, preferably in a suitable apparatus with recovery of the alcohol.

I claim as my invention:

1. The process of producing pectin comprising treating the rind or pomace of a citrus fruit to obtain a pectin solution therefrom and treating the said solution with a starch solution without affecting the pectin to precipitate the content therefrom which tends to cause turbidity.

2. The process of producing pectin comprising processing the rind or pomace of lemons, separating the pectin solution therefrom and clarifying the said pectin solution with a starch solution.

3. The process of producing pectin comprising treating the rind or pomace of a citrus fruit to obtain a pectin solution therefrom, clarifying the said pectin solution by treating the same with a starch solution and precipitating the pectin from the clarified solution of the same.

4. The process of producing pectin comprising treating the rind or pomace of a citrus fruit to obtain a pectin solution therefrom, treating the said solution with a starch solution to clarify the same, precipitating the pectin from the clarified solution by the use of alcohol and dehydrating and drying the precipitate.

5. The process of producing clear citrus pectin solutions comprising the step of treating such solutions with starch to clarify the same.

HUGO G. LOESCH.